United States Patent

Nishitani

[11] Patent Number: 5,886,815
[45] Date of Patent: Mar. 23, 1999

[54] BINOCULARS WITH DIOPTRIC AND FOCUS ADJUSTMENT

[75] Inventor: Kiyoshi Nishitani, Sakai, Japan

[73] Assignee: Minolta Co., Ltd., Osaka, Japan

[21] Appl. No.: 897,762

[22] Filed: Jul. 21, 1997

[30] Foreign Application Priority Data

Jul. 24, 1996 [JP] Japan .................................... 8-193803

[51] Int. Cl.⁶ ............................. G02B 23/00; G02B 7/06; G02B 7/12
[52] U.S. Cl. .......................................... 359/417; 359/426
[58] Field of Search ................................ 359/407–418, 359/425, 426

[56] References Cited

U.S. PATENT DOCUMENTS

| | | |
|---|---|---|
| 3,244,072 | 4/1966 | Dowling et al. . |
| 4,284,325 | 8/1981 | Ishibai et al. . |
| 4,986,644 | 1/1991 | Yang . |
| 5,191,471 | 3/1993 | Funathu .................................... 359/414 |
| 5,235,458 | 8/1993 | Akagi et al. ............................. 359/416 |
| 5,729,384 | 3/1998 | Nishitani et al. ........................ 359/407 |

Primary Examiner—Jon Henry
Attorney, Agent, or Firm—Burns, Doane, Swecker & Mathis, LLP

[57] ABSTRACT

Binoculars equipped with focus adjustment nut 53 to which left object lens holder 42 of the left optical system is linked, dioptric adjustment nut 61 to which right object lens holder 41 is linked and which is attached such that it may move relative to focus adjustment nut 53, and focus adjustment dial 51 and dioptric adjustment dial 63 to move said nuts, respectively. When dioptric adjustment dial 63 is operated, dioptric adjustment nut 61 moves along the optical axis, together with which movement right object lens holder 41 linked to dioptric adjustment nut 61 moves, whereby dioptric adjustment is carried out. Focus adjustment dial 51 is located on either the top or bottom surface of the binoculars, and dioptric adjustment dial 63 is located on the other surface.

17 Claims, 8 Drawing Sheets

BINOCULARS WITH DIOPTRIC AND FOCUS ADJUSTMENT

BACKGROUND OF THE INVENTION

1. Field of the Invention

The present invention pertains to binoculars in which at least one of the two optical systems is moved horizontally in directions perpendicular to the optical axes to perform pupil distance adjustment.

2. Description of the Prior Art

Conventionally, a method of performing dioptric adjustment by moving an eyepiece lens has offered the simplest construction and has been the mainstream approach. The mechanism is such that an one eyepiece lens system and the main body of the binoculars are connected via a screw mechanism, wherein when the eyepiece lens and the eyepiece lens holder that integrally holds said eyepiece lens are turned, the eyepiece lens system moves along the optical axis relative to the object optical system and dioptric adjustment is carried out. However, because the operating member to perform dioptric adjustment is located near the eyepiece lens, there is a possibility that it may be moved by mistake while using the binoculars, which creates an inconvenience.

With this as a backdrop, an object lens dioptric adjustment mechanism has been proposed in which dioptric adjustment is performed using the object lens. For example, Japanese Published Utility Model Application SHO 57-22163 discloses a construction in which two rods are linked to the two object lenses such that when the rods are moved together along the optical axes, both object lenses move and focus adjustment is performed, and when one pre-specified rod is moved, only one object lens moves and dioptric adjustment is carried out.

In the conventional binoculars described above, a rotational pupil distance adjustment mechanism is employed in which the distance between the right and left optical systems (hereinafter termed the pupil distance') is adjusted by rotating the optical systems around one or two shafts. In contrast, particularly with binoculars made compact and thin, those using a horizontal pupil distance adjustment mechanism are known in which one of the two optical systems is horizontally moved in directions perpendicular to the optical axes. Dioptric adjustment in binoculars using this horizontal pupil distance adjustment mechanism is also performed using the eyepiece lens.

In doing so, where the optical system comprises round lenses, the eyepiece lens and its holder may be rotated to perform dioptric adjustment. However, where the lenses are made non-round by cutting off the top and bottom ends in order to make the binoculars thinner, it is difficult to rotate the optical system, and therefore a dioptric adjustment mechanism must be used in which the eyepiece lens is horizontally moved by externally rotating a dial, etc.

Consequently, binoculars having a horizontal pupil distance adjustment mechanism cannot help but become complex in their construction. In addition, because dioptric adjustment in binoculars having the horizontal pupil distance adjustment mechanism is performed by moving the eyepiece lens, as described above, the operating member to perform dioptric adjustment is located near the eyepiece lens, and as a result it may be moved by mistake while using the binoculars.

It would thus be preferable for dioptric adjustment to be performed using the object lens. However, the conventional object lens dioptric adjustment mechanism is based on binoculars using the single-shaft or double-shaft rotational pupil distance adjustment mechanism and does not accommodate binoculars using the horizontal pupil distance adjustment mechanism. In addition, since the main purpose of binoculars using the horizontal pupil distance adjustment mechanism is compactness, unless the operating members for focus adjustment and dioptric adjustment are located at appropriate positions easy to access, operational errors might result.

SUMMARY OF THE INVENTION

The object of the present invention is to provide an object lens dioptric adjustment mechanism having a simple construction in binoculars employing the horizontal pupil distance adjustment mechanism. Another object of the present invention is to provide binoculars in which the operating member for dioptric adjustment is located at the most appropriate position.

In order to attain the objects described above, one aspect of the present invention consists of binoculars using the horizontal pupil distance adjustment mechanism in which at least one of the two optical systems is horizontally moved in directions perpendicular to the optical axes for the purpose of pupil distance adjustment, said binoculars comprising a first movable member, a second movable member that can move together with said first movable member and that may move relative to said first movable member, a first object lens that is linked to said first movable member and that is located in one optical system, a second object lens that is linked to said second movable member and that is located in the other optical system, a focus adjustment drive member which moves said first movable member, and a dioptric adjustment drive member that moves said movable member.

Using the construction described above, when the first movable member is driven by means of the focus adjustment drive member, the first movable member and the second movable member that is attached to the former member move together, whereby the object lenses of both optical systems move along the optical axes and focus adjustment is carried out. Subsequently, when the dioptric adjustment drive member is driven, only the second movable member moves, which moves the object lens of the optical system that is linked to the second movable member. Through this mechanism, dioptric adjustment is performed using the object lens of one optical system only.

Another aspect of the present invention consists of the binoculars described above, wherein the dioptric adjustment drive member is located between the two optical systems and on either the top or bottom surface of the binoculars such that it may be operated, and wherein the focus adjustment drive member is located on the other surface such that it may be operated.

Using this construction, the shafts used for the focus adjustment mechanism and for the dioptric adjustment mechanism are separate and parallel to each other. Therefore, the focus adjustment operating member that is regularly used may be located at a position at which the index finger naturally comes into contact with it when the binoculars are held by the user, while the dioptric adjustment operating member may be located slightly toward the object from the center on the bottom surface at a position that the user's fingers do not touch when the binoculars are being used but that may be touched if the thumb is slightly moved, because this operating member is not used often.

As described above, by applying an object lens dioptric adjustment mechanism in binoculars using the horizontal pupil distance adjustment mechanism, the binoculars will have a simple construction and have better operability. Moreover, when the first movable member is moved, both object lenses move and focus adjustment may be carried out, and when the second movable member is moved, only one object lens moves and dioptric adjustment may be carried out.

Further, the construction of the binoculars is very simple: They comprise a first movable member to which the object lens of one optical system is linked, a second movable member linked to the object lens of the other optical system, said second movable member being attached such that it can either move together with said first movable member or move relative to said first movable member, and a focus adjustment drive member and dioptric adjustment drive member that move said movable members.

These and other objects, advantages and features of the invention will become apparent from the following description thereof taken in conjunction with the accompanying drawings, which illustrate specific embodiment of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
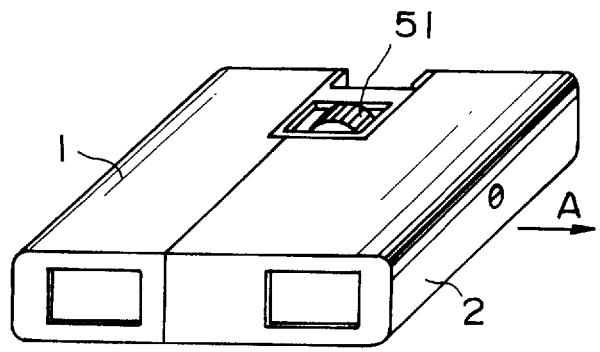
FIG. 1 is a drawing showing an external view of the binoculars pertaining to the first embodiment of the present invention when the pupil distance is reduced.

The embodiments of the present invention are explained in detail below. In the drawings used in the following explanation, the vertical directions and lateral directions of the binoculars are deemed for the sake of convenience the same as the vertical directions and lateral directions for the user when the binoculars are held to the eyes.

Figure 2:
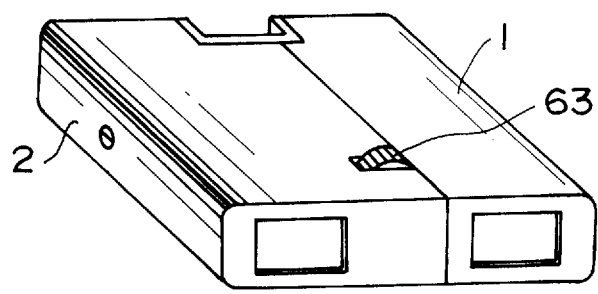
FIG. 2 is a drawing showing an external view of said binoculars seen from the rear when the pupil distance is reduced.
Figure 3:
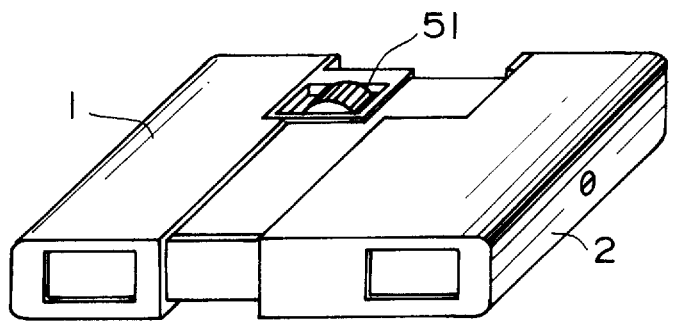
FIG. 3 is a drawing showing an external view of said binoculars where left cover 2 is pulled out in the direction of arrow A of FIG. 1 to increase the pupil distance.
Figure 4:
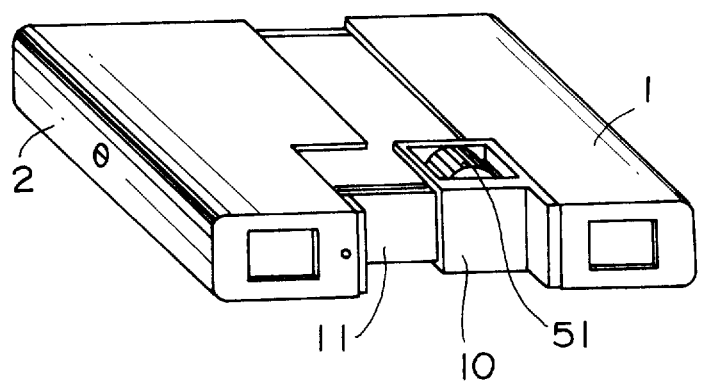
FIG. 4 is a drawing showing an external view of said binoculars seen from the eyepiece side when the pupil distance is increased.
Figure 5:
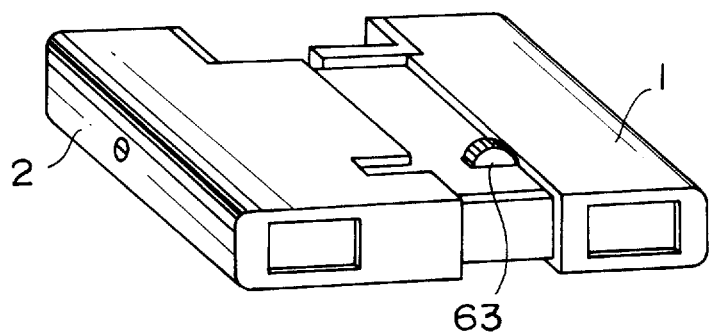
FIG. 5 is a drawing showing an external view of said binoculars seen from the rear when the pupil distance is increased.

FIGS. 1 through 5 show an external view of binoculars of a first embodiment. FIG. 1 shows them when the pupil distance is reduced, and FIG. 2 shows the same situation seen from the bottom. FIG. 3 shows said binoculars when left cover 2 is pulled out in the direction of arrow A of FIG. 1 to increase the pupil distance. FIG. 4 shows the same situation seen from the eyepiece side, and FIG. 5 shows the same situation seem from the bottom.

Figure 6:
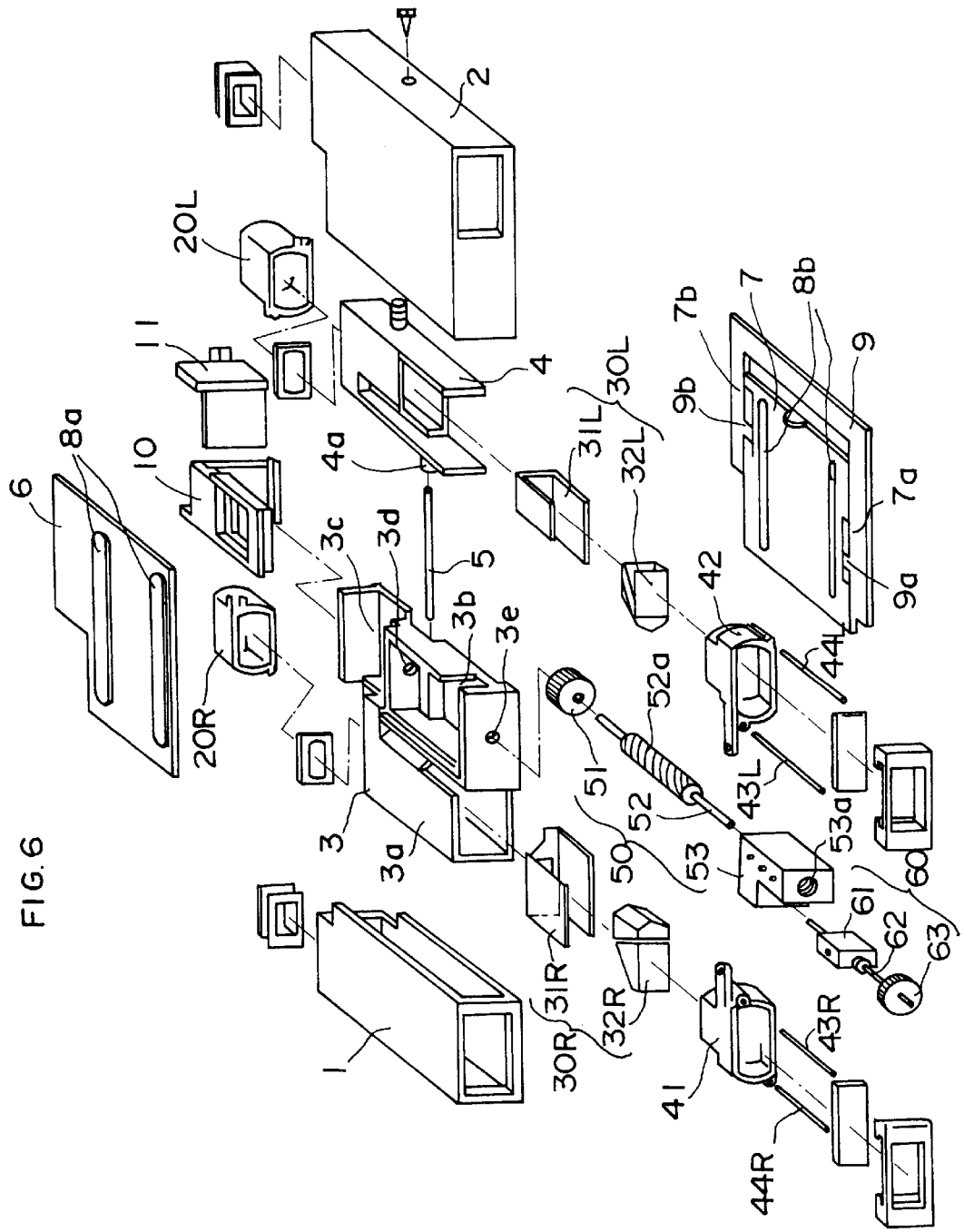
FIG. 6 is a drawing showing the components of said binoculars in a disassembled state.
Figure 7:
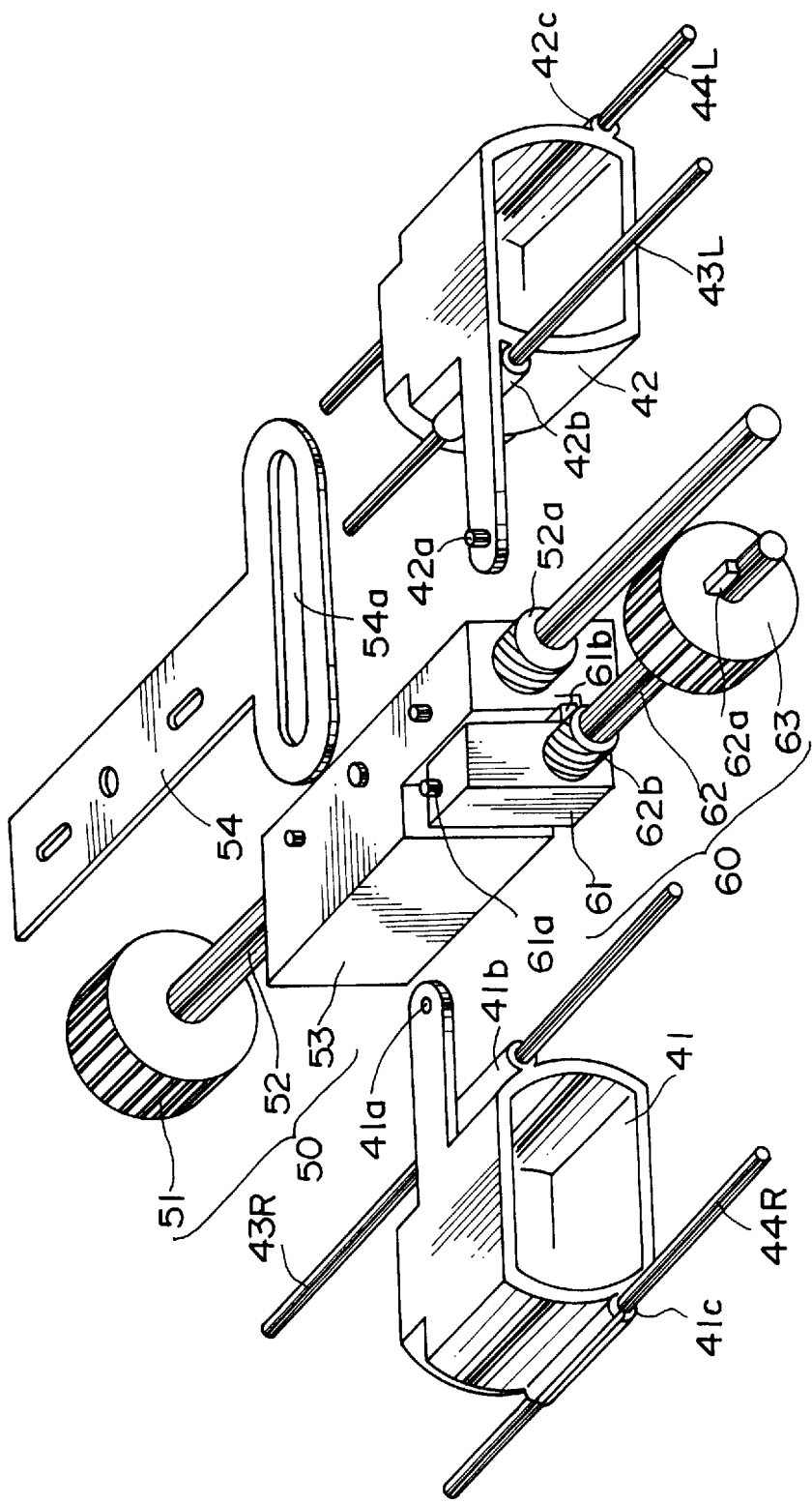
FIG. 7 is a drawing showing right and left object lens holders 41 and 42, focus adjustment unit 50 and dioptric adjustment unit 60 of said binoculars.
Figure 8:
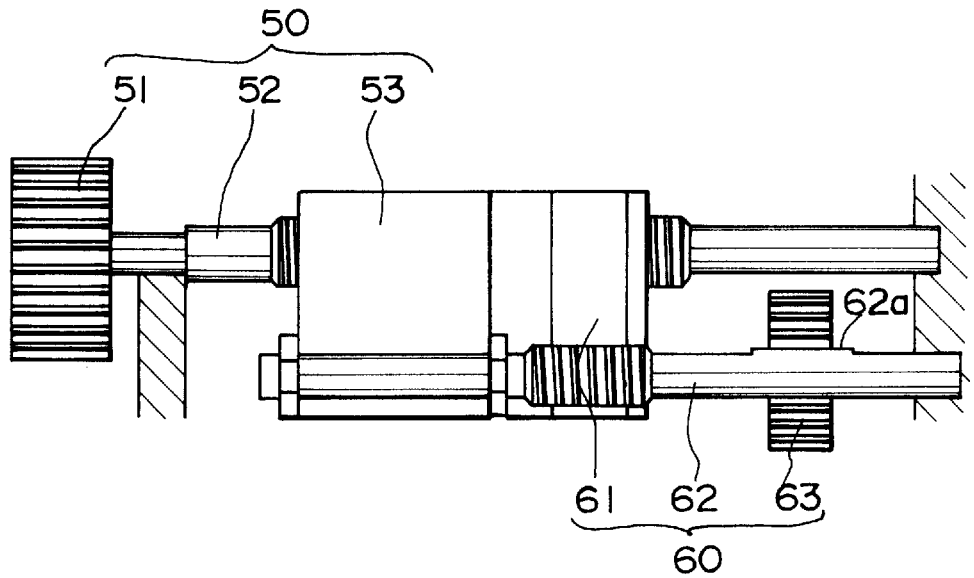
FIG. 8 is a drawing showing a cross-sectional view of focus adjustment unit 50 and dioptric adjustment unit 60 of said binoculars.
Figure 9:
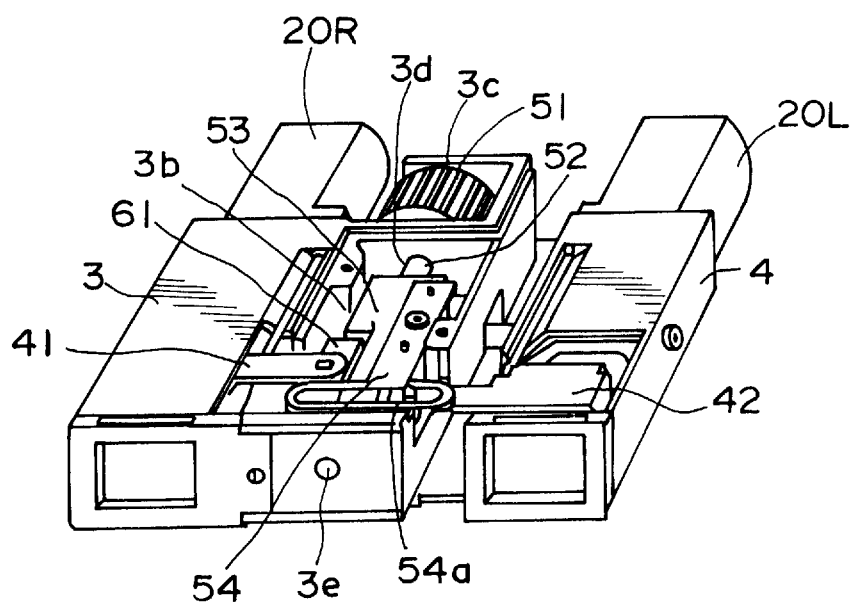
FIG. 9 is a drawing showing said binoculars in an assembled state, from which right cover 1, left cover 2 and top plate 6 are removed to show focus adjustment unit 50 inside.

FIG. 6 is a drawing showing the components of said binoculars in a disassembled state. FIG. 7 shows right and left object lens holders 41 and 42, focus adjustment unit 50 and dioptric adjustment unit 60 removed from the binoculars. FIG. 8 shows a cross-sectional view of focus adjustment unit 50 and dioptric adjustment unit 60. FIG. 9 shows said binoculars from which some components are removed to show focus adjustment unit 50 and dioptric adjustment unit 60 inside.

As shown in FIG. 6, fixed body 3 is divided into two right and left parts. Among these, an optical system is incorporated in right fixed body part 3a. This optical system consists of eyepiece unit 20R, prism unit 30R comprising prism holder 31R and erecting prism 32R, and right object lens holder 41 which integrally holds an object lens.

Eyepiece unit 20R is attached to the eyepiece side of right fixed body part 3a. Erecting prism 32R integrally held by prism holder 31R is incorporated into right fixed body part 3a from the object side together with right object lens holder 41. These components are aligned, from the eyepiece side to the object side, in the order of prism unit 30R and right object lens holder 41.

In contrast to right fixed body part 3a, focus adjustment unit 50 and dioptric adjustment unit 60 that are incorporated in left fixed body parts 3b through 3e will be explained. Left fixed body parts 3b through 3e are further classified as belonging to the object side or eyepiece side, and include object side frame unit 3b and eyepiece side frame unit 3c. Hole 3d is formed on the frame that serves as a border between object side frame unit 3b and eyepiece side frame unit 3c. Hole 3e is formed on the frame facing the frame on which hole 3d is formed, among frames comprising object side frame unit 3b.

Focus adjustment unit 50 that is incorporated in left fixed body parts 3b through 3e comprises focus adjustment dial 51, focus adjustment shaft 52, focus adjustment nut 53, adjustment plate 54 (see FIG. 7), etc. Dioptric adjustment unit 60 comprises dioptric adjustment nut 61, dioptric adjustment shaft 62, dioptric adjustment dial 63, etc.

FIG. 9 shows dioptric adjustment nut 61 and adjustment plate 54 attached to focus adjustment nut 53. As shown in the drawing, dioptric adjustment unit 60 and adjustment plate 54 are attached to focus adjustment nut 53. These are then housed inside object side frame unit 3b as one integrated unit. Thread 52a is formed in the middle area of focus adjustment shaft 52, such that it may engage with screw hole 53a of focus adjustment nut 53 (see FIG. 6). Focus adjustment shaft 52 thus pierces through focus adjustment nut 53.

One end of focus adjustment shaft 52 that pierces through focus adjustment nut 53 is rotatably engaged with hole 3e. The part of focus adjustment shaft 52 opposite from the end engaged with hole 3e, across focus adjustment nut 53, first engages with hole 3d. At the far end of said part is mounted focus adjustment dial 51 that is housed in eyepiece side frame unit 3c.

On the other hand, an optical system is incorporated in movable body 4. This optical system consists of eyepiece unit 20L, prism unit 30L comprising prism holder 31L and erecting prism 32L, and left object lens holder 42 which is integrated with an object lens, etc. In the same manner as the optical system that is incorporated in right fixed body part 3a, eyepiece unit 20L is attached to the eyepiece side of movable body 4 while prism unit 30L and left object lens holder 42 are assembled from the object side.

Right and left covers 1 and 2 are attached to fixed body 3 and movable body 4 in which an optical system or focus adjustment unit 50 and dioptric adjustment unit 60 are incorporated in the manner described above. Right cover 1 is fixed to fixed body 3 and left cover 2 is attached to movable body 4 by means of the floating construction described below.

In the binoculars of the present embodiment, pupil distance adjustment is carried out by laterally moving movable body 4 relative to fixed body 3. In this case, the user should directly hold left cover 2 to move it. As left cover 2 moves laterally, movable body 4, which is integrated with left cover 2, also moves.

Fixed body 3 and movable body 4 are connected by means of guide shaft 5 such that movable body 4 may laterally move relative to fixed body 3. When it moves laterally, left cover 2 slides relative to top and bottom plates 6 and 7 that are attached to fixed body 3, in a manner described below.

Figure 10:
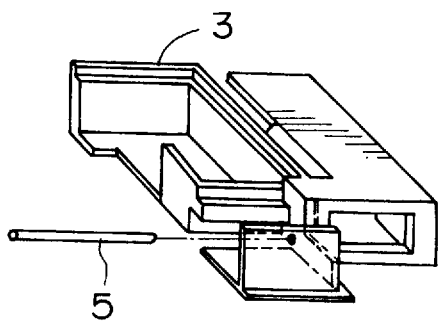
FIG. 10 is a drawing showing the fixing of guide shaft 5 to fixed body 3 of said binoculars as seen from the rear.

FIG. 10 shows fixed body 3 and guide shaft 5 removed from the binoculars and seen from the eyepiece side to indicate the manner in which guide shaft 5 is fixed to fixed body 3. As shown in the drawing, guide shaft 5 is fixed to fixed body 3 and is slidably engaged with sheath 4a located on movable body 4 (see FIG. 6). Movable body 4 moves laterally relative to fixed body 3 by sliding over guide shaft 5.

Figure 11:
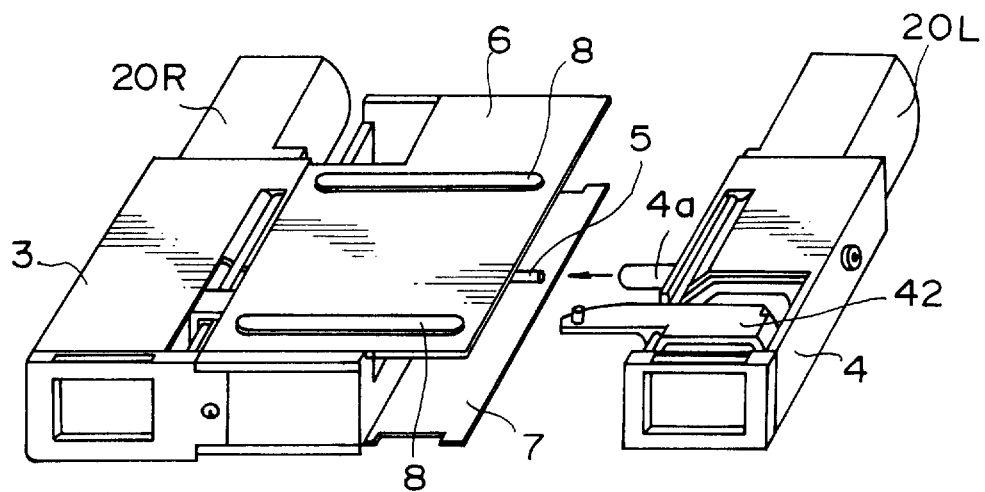
FIG. 11 is a drawing showing said binoculars in an assembled state, from which right cover 1 and left cover 2 are removed.

FIG. 11 shows the binoculars of this embodiment from which right and left covers 1 and 2 are removed to show top and bottom plates 6 and 7 attached to fixed body 3 inside. Top and bottom plates 6 and 7 are fixed to the top and bottom surfaces of fixed body 3, respectively, and extend toward movable body 4 such that they can sandwich movable body 4.

A spring is inserted between movable body 4 and top plate 6 (not shown in the drawings). It serves to press movable body 4 onto bottom plate 7. After top and bottom plates 6 and 7 are fixed onto fixed body 3 in this way, right and left covers 1 and 2 are attached to fixed body 3 and movable body 4, respectively.

Top and bottom plates 6 and 7 are constructed in the manner described below so as to allow left cover 2 to slide relative to top and bottom plates 6 and 7 in a stable fashion. As shown in FIG. 6, two rails 8a protruding slightly upward and two rails 8b protruding slightly downward are located on top and bottom plates 6 and 7, respectively, each extending some distance laterally. Gaps are formed between left cover 2 and top and bottom plates 6 and 7, but because rails 8a and 8b are in close contact with left cover 2, left cover 2 is vertically stable.

Notches 7a and 7b facing forward and backward, respectively, are formed on bottom plate 7. Claws 9a and 9b of stopper lever 9 fixed to left cover 2 engage with notches 7a and 7b to operate as a stopper when left cover 2 is pulled out. In addition, the edge surface of bottom plate 7 and the edge surface of stopper lever 9 engage closely together with no play, and serve as a guide for left cover 2 when it laterally slides.

As described above, when pupil distance adjustment is performed, movable body 4 slides using guide shaft 5 and left cover 2 slides using top and bottom plates 6 and 7 as a guide. When this occurs, if movable body 4 and left cover 2 suffered from excessive binding, the stability of the optical axis when movable body 4 moves would be lost.

Figure 12:
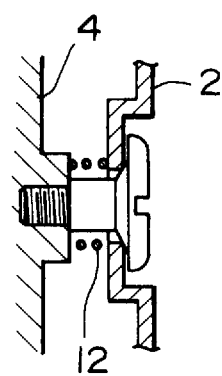
FIG. 12 is a drawing showing a floating construction in which left cover 2 is attached to movable body 4 in said binoculars.

Therefore, the mechanism by which movable body 4 is attached to left cover 2 has a floating construction. The floating construction used here involves a slight gap between the members to be attached to each other, or further, insertion of a spring into the gap such that play is allowed to occur within a prescribed range. FIG. 12 shows a floating construction in which spring 12 is inserted between movable body 4 and left cover 2.

As explained above, movable body 4 obtains a stable optical axis by means of guide shaft 5, and by maintaining movable body 4 in position by means of left cover 2 and top and bottom plates 6 and 7, the effect of an external force on the optical axis is eliminated to the greatest possible extent.

In the binoculars of this embodiment, when pupil distance adjustment is performed, an empty space is formed between movable body 4 and fixed body 3. In order to cover this empty space, left cover 2 that laterally moves during pupil distance adjustment is made larger than right cover 1. In this way, the top and bottom of the empty space and its object side are covered. The eyepiece side of the empty space is covered by barrier 11 which is integrally attached to left cover 2.

Barrier 11 is protected by dial cover 10 and top and bottom plates 6 and 7 in order to prevent it from being damaged by the direct application of external force. This dial cover 10 is recessed from the eyepiece surfaces of right and left covers 1 and 2 so that these right and left covers 1 and 2 are prevented from interfering with the nose when the user holds the binoculars to his eyes. This configuration is maintained even where left cover 2 is pulled open, as shown in FIG. 4.

The constructions of focus adjustment unit 50 and dioptric adjustment unit 60 of the binoculars of this embodiment are explained with reference to FIGS. 7 and 8. First, dioptric adjustment unit 60 has the following construction. Key 62a is located on one end of dioptric adjustment shaft 62, and is slidably engaged with a key groove formed on dioptric adjustment dial 63. When dioptric adjustment dial 63 is turned, dioptric adjustment shaft 62 rotates together with it.

Thread 62b is formed on the middle part of dioptric adjustment shaft 62, and is engaged with a screw hole formed in dioptric adjustment nut 61. Dioptric adjustment shaft 62 thus pierces through dioptric adjustment nut 61. When dioptric adjustment shaft 62 rotates, dioptric adjustment nut 61 moves along the optical axis relative to focus adjustment nut 53.

Guide 61b is located on dioptric adjustment nut 61, and is slidably engaged with a groove formed on focus adjustment nut 53 of focus adjustment unit 50. Consequently, dioptric adjustment nut 61 does not rotate in an integrated fashion with dioptric adjustment shaft 62, and can move along the optical axis relative to focus adjustment nut 53.

In addition, pin 61a is located on the top surface of dioptric adjustment nut 61. This pin 61a is engaged with hole 41a formed at the tip of the arm of right object lens holder 41. When dioptric adjustment nut 61 moves along the optical axis, right object lens holder 41 moves together with it.

The end of dioptric adjustment shaft 62 opposite from the end to which dioptric adjustment dial 63 is attached, across dioptric adjustment nut 61, is attached to focus adjustment nut 53. Here, although dioptric adjustment shaft 62 can rotate, it cannot move along the optical axis relative to focus adjustment nut 53.

Focus adjustment unit 50 has the following construction. Focus adjustment dial 51 is fixed to one end of focus adjustment shaft 52. When focus adjustment dial 51 is turned, focus adjustment shaft 52 rotates together with it.

Thread 52a is formed in the middle part of focus adjustment shaft 52, and is engaged with screw hole 53a (see FIG. 6) formed in focus adjustment nut 53. Focus adjustment shaft 52 thus pierces through focus adjustment nut 53. The end of focus adjustment shaft 52 opposite from the end to which focus adjustment dial 51 is attached, across focus adjustment nut 53, is engaged with hole 3e formed in fixed body 3 as described above.

Adjustment plate 54 is fixed to focus adjustment nut 53. The position at which it is fixed may be adjusted along the optical axis. Because of this adjustability, the standard positions of the right and left optical systems may be adjusted in the initial state prior to the performing of focus adjustment and dioptric adjustment.

As described above, dioptric adjustment unit 60, as well as adjustment plate 54, is attached to focus adjustment nut 53. Therefore, when focus adjustment shaft 52 rotates, focus adjustment nut 53 and adjustment plate 54 and dioptric adjustment unit 60, which are attached to focus adjustment nut 53 in an integrated fashion, move along the optical axis.

Pin 42a is located at the tip of the arm of left object lens holder 42. This pin 42a slidably engages with oblong hole 54a, which extends laterally on adjustment plate 54 (see FIG. 9). As adjustment plate 54 moves along the optical axis, left object lens holder 42 also moves along the optical axis.

Based on the constructions of focus adjustment unit 50 and dioptric adjustment unit 60 explained above, dioptric adjustment and focus adjustment in the binoculars of this embodiment are performed in the following manner. For dioptric adjustment, first, dioptric adjustment dial 63 is turned.

When dioptric adjustment dial 63 rotates, dioptric adjustment shaft 62 rotates as well, and dioptric adjustment nut 61 moves along the optical axis. As this takes place, right object lens holder 41, which is fixed to dioptric adjustment nut 61 via pin 61a, also moves. In other words, the dioptric difference between the right and left optical systems is corrected by moving right object lens holder 41 only.

For focus adjustment, focus adjustment dial 51 is turned. When focus adjustment dial 51 rotates, focus adjustment shaft 52 also rotates, and focus adjustment nut 53 moves along the optical axis. Because right and left object lens holders 41 and 42 are linked to focus adjustment nut 53 via adjustment plate 54 and dioptric adjustment nut 61, these also move along the optical axes in a synchronized fashion.

In other words, focusing is carried out by simultaneously moving right and left object lens holders 41 and 42. When this takes place, the position of dioptric adjustment nut 61 relative to focus adjustment nut 53, which is achieved through dioptric adjustment, is maintained. Unless dioptric adjustment dial 63 is turned, the position of dioptric adjustment nut 61 is fixed.

In the binoculars of this embodiment, guide shafts 43R and 43L and rotation stopper shafts 44R and 44L are used in connection with the movement of right and left object lens holders 41 and 42, respectively, as shown in FIG. 7. These shafts are engaged with guide holes 41b and 42b and U-grooves 41c and 42c, respectively, that are formed on the lens holders.

The ends of shafts 43R, 43L, 44R and 44L are attached to fixed body 3 and movable body 4 in which right and left object lens holders 41 and 42 are incorporated, respectively. Right and left object lens holders 41 and 42 move along the optical axes while sliding over these guide shafts 43R and 43L and rotation stopper shafts 44R and 44L, respectively.

The binoculars of this embodiment consist of roof prism binoculars, in which each optical system comprises an object lens to form the object image at the focal point position, an erecting prism that erects the image that is inverted by the object lens, and an eyepiece lens that enlarges the image formed by the object lens. As a means to reduce the size and thickness of binoculars, it is generally possible to use an object lens having a small effective apertures. However, such binoculars would have a dark field of view.

Figure 13:
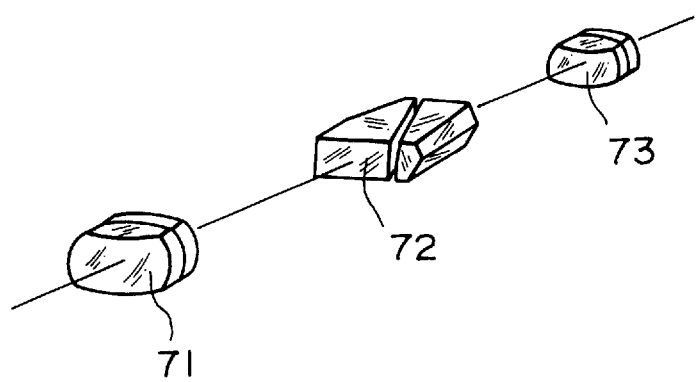
FIG. 13 is a drawing showing the optical system used in said binoculars.

Therefore, a non-round lens obtained by cutting off the top and bottom ends of a round lens in a straight-edge fashion is used. FIG. 13 shows non-round object lens 71, erecting prism 72 and eyepiece lens 73 in the binoculars of this embodiment. In conformity with object lens 71, eyepiece lens 73 is also made non-round.

Guide holes 41b and 42b and U-grooves 41c and 42c should be formed within the height of right and left object lens holders 41 and 42, which are also non-round to accommodate the object lenses. In the binoculars of this embodiment, the entire binoculars are made thin in this way.

Figure 14:
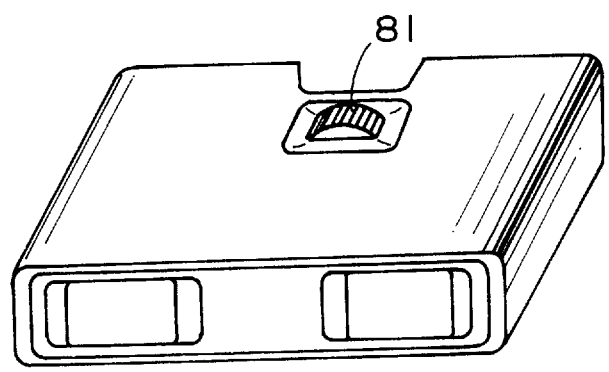
FIG. 14 is a drawing showing an external view of binoculars of a second embodiment of the present invention when the pupil distance is reduced.
Figure 15:
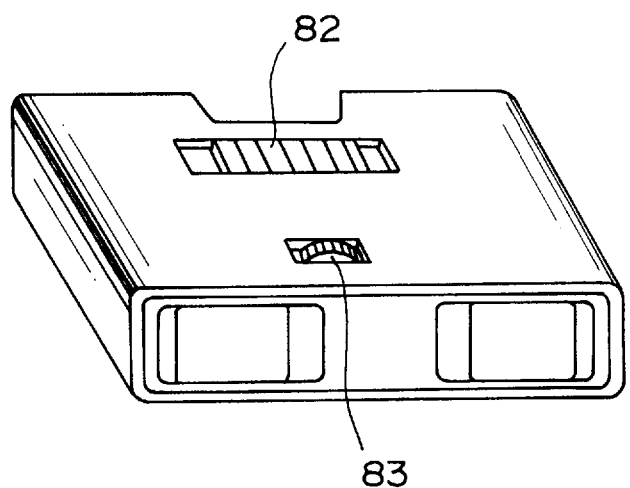
FIG. 15 is a drawing showing an external view of said binoculars of the second embodiment seen from the rear when the pupil distance is reduced.

FIG. 14 shows an external view of a second embodiment of the present invention. FIG. 15 shows said binoculars seen from the bottom. In these binoculars, pupil distance adjustment is carried out by laterally sliding pupil distance adjustment lever 82 shown in FIG. 15. While the construction regarding pupil distance adjustment is different from that of the binoculars of the first embodiment, they are also binoculars using the horizontal pupil distance adjustment method, and the same focus adjustment and dioptric adjustment mechanisms as those used in the first embodiment are employed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. Binoculars having a pair of optical systems and a mechanism for varying a distance between the optical systems by moving at least one of the optical systems in a plane with which the optical systems are aligned, comprising:

a first movable member;

a second movable member which is attached to said first movable member;

a first object lens unit which is an element of one of the optical systems, said first object lens unit is interlocked with said first movable member so as to move together with said first movable member along an optical axis direction and slidingly move relative to said first movable member in a direction perpendicular to the optical axis direction;

a second object lens unit which is an element of the other of the pair of optical systems, said second object lens unit is interlocked with said second movable member;

a focus adjustment member which moves said first movable member together with said second movable member so as to adjust focusing condition of the binoculars; and a dioptric adjustment member which moves said second movable member relative to said first movable member so as to adjust dioptric condition of the binoculars.

2. Binoculars as claimed in claim 1, wherein said second movable member is attached to said dioptric adjustment member such that said second movable member is moved in a direction along an optical axis when said dioptric adjustment member is rotated, so that said second object lens unit is moved together with said second movable member.

3. Binoculars as claimed in claim 1, wherein said focus adjustment member is located at one of upper and lower surfaces of the binoculars and said dioptric adjustment member is located another of the surfaces.

4. Binoculars as claimed in claim 3, wherein said optical systems include a pair of eyepiece lens units, and said focus adjustment member is located closer to said eyepiece lens unit than said object lens unit.

5. Binoculars as claimed in claim 4, wherein said focus adjustment member is located at upper surface of the binoculars.

6. Binoculars as claimed in claim 3, wherein said optical systems include a pair of eyepiece lens units, and said dioptric adjustment member is located closer to said object lens unit than said eyepiece lens unit.

7. Binoculars as claimed in claim 6, wherein said dioptric adjustment member is located at lower surface of the binoculars.

8. Binoculars having a pair of optical system, comprising:

a first holder which holds one of said optical systems;

a second holder which holds another of said optical systems, and slidably connected with said first holder so as to vary relative distance between said optical systems;

a first movable member held in said first holder and movable in a direction along the optical axis of the optical systems together with an objective lens unit of one of the optical systems; and a second movable member held in said second holder and movable in a direction along the optical axis together with an objective lens unit of another of the optical systems;

wherein said second movable member is moved together with said first movable member when the first movable member is operated to move, and said first movable member is stationary when said second movable member is operated to move.

9. Binoculars as claimed in claim 8, wherein said second movable member is slidably interlocked with said first movable member.

10. Binoculars as claimed in claim 9, wherein said first movable member and said second movable member are relatively interlocked by means of a shaft, and said shaft is rotatably supported in said first movable member and is attached to said second movable member.

11. Binoculars as claimed in claim 10, wherein said shaft is externally rotated for moving said second movable member relative to said first movable member.

12. Binoculars having a pair of optical system, comprising:

a first holder which holds one of said optical systems;

a second holder which holds another of said optical systems, and slidably connected with said first holder so as to vary relative distance between said optical systems;

a first movable member held in said first holder and movable in a direction along the optical axis of the optical systems together with an objective lens unit of one of the optical systems; and a second movable member held in said second holder and movable in a direction along the optical axis together with an objective lens unit of another of the optical systems;

wherein said second movable member is moved together with said first movable member when the first movable member is operated to move, and said first movable member is stationary when said second movable member is operated to move, wherein said first movable member and said second movable member are slidably interlocked by means of a shaft, and said shaft is rotatably supported in said first movable member and is attached to said second movable member, wherein said shaft is externally rotated for moving said second movable member relative to said first movable member, and wherein said shaft is provided with a dial which projects from a lower surface of the binoculars.

13. Binoculars as claimed in claim 9, wherein said first movable member is held in said first holder by means of a shaft which is attached to said first movable member.

14. Binoculars having a pair of optical system, comprising:

a first holder which holds one of said optical systems;

a second holder which holds another of said optical systems, and slidably connected with said first holder so as to vary relative distance between said optical systems;

a first movable member held in said first holder and movable in a direction along the optical axis of the optical systems together with an objective lens unit of one of the optical systems; and a second movable member held in said second holder and movable in a direction along the optical axis together with an objective lens unit of another of the optical systems;

wherein said second movable member is moved together with said first movable member when the first movable member is operated to move, and said first movable member is stationary when said second movable member is operated to move, wherein said second movable member is slidably interlocked with said first movable member, wherein said first movable member is held in said first holder by means of a shaft which is attached to said first movable member, and wherein said shaft is provided with a dial which projects from an upper surface of the binoculars.

15. Binoculars as claimed in claim 12, wherein said first movable member is held in said first holder by means of a second shaft which is screwed into said first movable member.

16. Binoculars as claimed in claim 15, wherein said second shaft is provided with a second dial which projects from an upper surface of the binoculars.

17. Binoculars as claimed in claim 16, wherein said first dial is located at a position where said objective lens units are positioned closer to said first dial than said second dial.

* * * * *